United States Patent
Dhana et al.

(10) Patent No.: US 11,961,198 B2
(45) Date of Patent: Apr. 16, 2024

(54) SYSTEM AND METHOD FOR IMPROVED GENERATION OF AVATARS FOR VIRTUAL TRY-ON OF GARMENTS

(71) Applicant: Dhana Inc., Sausalito, CA (US)

(72) Inventors: Indra Shamini Dhana, Mill Valley, CA (US); Geelapaturu Subrahmanya Venkata Radha Krishna Rao, Chennai (IN); Dinesh Reddy Vemula, Mahabubabad District (IN)

(73) Assignee: Dhana Inc., Sausalito, CA (US)

( * ) Notice: Subject to any disclaimer, the term of this patent is extended or adjusted under 35 U.S.C. 154(b) by 28 days.

(21) Appl. No.: 17/380,761

(22) Filed: Jul. 20, 2021

(65) Prior Publication Data
US 2023/0024666 A1   Jan. 26, 2023

(51) Int. Cl.
*G06T 19/20*     (2011.01)
*G06F 16/22*    (2019.01)
(Continued)

(52) U.S. Cl.
CPC .......... *G06T 19/20* (2013.01); *G06F 16/2282* (2019.01); *G06F 18/24* (2023.01); *G06N 3/08* (2013.01); *G06T 7/12* (2017.01); *G06T 7/60* (2013.01); *G06V 10/46* (2022.01); *G06V 40/10* (2022.01); *G06T 2200/24* (2013.01); *G06T 2207/10024* (2013.01);
(Continued)

(58) Field of Classification Search
None
See application file for complete search history.

(56) References Cited

U.S. PATENT DOCUMENTS 10,777,020 B2   9/2020   Aluru et al.
2014/0277663 A1*   9/2014   Gupta ................... G06Q 50/04
700/98
(Continued)

FOREIGN PATENT DOCUMENTS

CN   110046041 A   7/2019
CN   112308122 A   2/2021
(Continued)

OTHER PUBLICATIONS

Leong et al.; "Automatic body feature extraction from a marker-less scanned human body;" Computer-Aided Design 39 (2007), pp. 568-582; Elsevier Ltd. (Year: 2007).*

(Continued)

*Primary Examiner* — Edward Martello
(74) *Attorney, Agent, or Firm* — Lerner David LLP

(57) ABSTRACT

A system and a method for improved generation of 3D avatars for virtual try-on of garments is provided. Inputs from a first user type are received, via a first input unit, for generating one or more garment types in a graphical format. Further, a 3D avatar of a second user type is generated in a semi-automatic manner or an automatic manner based on capturing a first input type or a second input type respectively received via a second input unit. The first input type comprises measurements of body specifications of the second user type and the second input type comprises body images of the second user type. Further, the generated garments are rendered on the generated 3D avatar of the second user type for carrying out a virtual try-on operation.

28 Claims, 7 Drawing Sheets

(51) Int. Cl.
G06F 18/24 (2023.01)
G06N 3/08 (2023.01)
G06T 7/12 (2017.01)
G06T 7/60 (2017.01)
G06V 10/46 (2022.01)
G06V 40/10 (2022.01)
H04L 51/18 (2022.01)

(52) U.S. Cl.
CPC ............... *G06T 2207/20084* (2013.01); *G06T 2207/30196* (2013.01); *G06T 2219/2004* (2013.01); *G06T 2219/2016* (2013.01); *H04L 51/18* (2013.01)

(56) References Cited

U.S. PATENT DOCUMENTS

| | | | |
|---|---|---|---|
| 2016/0088284 A1* | 3/2016 | Sareen | G06T 3/60 348/47 |
| 2019/0357615 A1* | 11/2019 | Koh | G06T 17/10 |
| 2020/0126316 A1 | 4/2020 | Sharma et al. | |
| 2020/0285934 A1 | 9/2020 | Hinton et al. | |
| 2021/0089896 A1* | 3/2021 | Clayton | G06V 10/44 |
| 2021/0142539 A1 | 5/2021 | Ayush et al. | |

FOREIGN PATENT DOCUMENTS

| | | |
|---|---|---|
| WO | 2020131518 A1 | 6/2020 |
| WO | 2020156627 A1 | 8/2020 |

OTHER PUBLICATIONS

De Souza et al.; "Predicting body measures from 2D images using Convolutional Neural Networks;" 2020 International Joint Conference on Neural Networks (IJCNN)—Jul. 19-24, 2020 Year: 2020 | Conference Paper | Publisher: IEEE (Year: 2020).*

Deepak Panta; Bachelor's Thesis; "Web crawling and scraping: developing a sale-based website;" Turku University of Applied Sciences; Turku, Finland; pp. 1-41 (Year: 2015).*

LaLonde et al.; "Capsules for Object Segmentation;" 1st Conference on Medical Imaging with Deep Learning (MIDL 2018), Amsterdam, The Netherlands, arXiv:1804.04241v1; Apr. 11, 2018 (Year: 2018).*

Jiang et al.; "Skeleton-Aware 3D Human Shape Reconstruction from Point Clouds;" 2019 IEEE/CVF International Conference on Computer Vision (ICCV); pp. 5430-5434 (Year: 2019).*

Lawrence Cayton; "Fast Nearest Neighbor Retrieval for Bregman Divergences;" Proceedings of the 25 th International Confer-ence on Machine Learning, Helsinki, Finland, 2008; pp. 112-119 (Year: 2008).*

Kirana et al.; "Improved Neural Network using Integral-RELU based Prevention Activation for Face Detection;" 2019 International Conference on Electrical, Electronics and Information Engineering (ICEEIE), 2019, pp. 260-263 (Year: 2019).*

Markiewicz et al.; "3D anthropometric algorithms for the estimation of measurements required for specialized garment design;" Expert Systems With Applications; pp. 366-385; Elsevier Ltd. (Year: 2017).*

Zhou et al.; "Graph neural networks: A review of methods and applications;" AI Open 1 (2020) pp. 57-81; Published by Elsevier B.V. on behalf of KeAi Communications Co., Ltd; Apr. 8, 2021 (Year: 2021).*

Sharma et al.; "Development of an Intelligent Data-Driven System to Recommend Personalized Fashion Design Solutions;" Sensors 2021, 21, 4239; 28 pages; MDPI, Basel, Switzerland (Year: 2021).*

Zhu et al.; "Human Pose Estimation Based on Deep Neural Network;" IEEE; ICALIP 2018; pp. 90-96 (Year: 2018).*

Ileperuma et al.; "An Enhanced Virtual Fitting Room using Deep Neural Networks;" 2020 2nd International Conference on Advancements in Computing (ICAC); pp. 67-72; IEEE (Year: 2020).*

Garg et al.; "FABRIK: An Online Collaborative Neural Network Editor;" 28 pages; arXiv:1819.11649v1 [cs.LG] Oct. 27, 2018 (Year: 2018).*

Kinli, et al., "FashionCapsNet: Clothing Classification with Capsule Networks." International Journal of Informatics Technologies., vol. 13, Issue 1, Jan. 2020, pp. 87-96.

Yoon, et al., "Neural 3D Clothes Retargeting from a Single Image." arXiv: 2102.0062 [cs.CV] Jan. 29, 2021, pp. 1-20. https://arxiv.org/abs/2102.00062.

Yuan, M. et al., "A Mixed Reality Virtual Clothes Try-On System" IEEE Transactions on Multimedia, Dec. 2013, pp. 1958-1968 vol. 15, issue 8, DOI: 10.1109/TMM.2013.2280560 see, for example, the entire document.

International Search Report and Written Opinion issued in Appln. No. PCT/US2022/037542 dated Oct. 26, 22 (5 pages).

* cited by examiner

SYSTEM AND METHOD FOR IMPROVED GENERATION OF AVATARS FOR VIRTUAL TRY-ON OF GARMENTS

FIELD OF THE INVENTION

The present invention relates generally to the field of avatar generation and virtual try-on of garments. More particularly, the present invention relates to a system and a method for improved generation of 3D avatars for virtual try-on of garments.

BACKGROUND OF THE INVENTION

Consumers are increasingly purchasing garments online via various e-commerce websites, web-based applications and portals. With proliferation of the online garment purchasing trend consumers (users) are looking for garments that best fit and suit them by virtually trying-on garments prior to purchasing. The virtual try-on of garments is usually done by generating one or more human body models of the user in an avatar form and rendering a selected garment on the generated avatar, before purchasing. It has been observed that existing e-commerce websites, web-based applications and portals do not readily render adequate options related to generation of avatar for virtual try-on of garments, prior to purchasing.

Typically, existing systems associated with e-commerce websites, web-based applications and portals, which provide for generation of avatars for virtual try-on of garments are associated with various inefficiencies. It has been observed that the existing e-commerce websites, web-based applications and portals are not able to generate an avatar with accurate body specifications of the users. Further, the existing systems provide limited options to the users for creating their own avatars, such that the users are not able to provide inputs from their end. Further, the existing systems do not provide adequate options to the users for efficiently comparing the garments using the virtual-try on technique. Furthermore, the existing systems are restricted to providing virtual try-on of garments in a single front view of the user and not any other view.

In light of the above drawbacks, there is a need for a system and a method for improved generation of avatars for virtual try-on of garments. There is a need for a system and a method which provides for generating avatars of users with accurate body specifications. Further, there is a need for a system and a method which provides for efficiently capturing inputs from users for avatar generation. Furthermore, there is a need for a system and a method which provides for efficient comparison of garments using the virtual-try on technique.

SUMMARY OF THE INVENTION

In various embodiments of the present invention, a system for improved generation of 3D avatars for virtual try-on of garments is provided. The system comprises a memory storing program instructions, a processor executing the instructions stored in the memory and an avatar generation engine executed by the processor. The avatar generation engine is configured to receive inputs from a first user type, via a first input unit, for generating one or more garment types in a graphical format. Further, the avatar generation engine is configured to generate a 3D avatar of a second user type in a semi-automatic manner or an automatic manner based on capturing a first input type or a second input type respectively received via a second input unit. The first input type comprises measurements of body specifications of the second user type and the second input type comprises body images of the second user type. Lastly, the avatar generation engine is configured to render the generated garments on the generated 3D avatar of the second user type for carrying out a virtual try-on operation.

In various embodiments of the present invention, a method for improved generation of 3D avatars for virtual try-on of garments is provided. The method is implemented by a processor executing program instructions stored in a memory. The method comprises receiving inputs from a first user type, via a first input unit, for generating one or more garment types in a graphical format. Further, the method comprises generating a 3D avatar of a second user type in a semi-automatic manner or an automatic manner based on capturing a first input type or a second input type respectively received via a second input unit. The first input type comprises measurements of body specifications of the second user type and the second input type comprises body images of the second user type. Lastly, the method comprises rendering the generated garments on the generated 3D avatar of the second user type for carrying out a virtual try-on operation.

In various embodiment of the present invention, a computer program product is provided. The computer program product comprises a non-transitory computer-readable medium having computer program code stored thereon, the computer-readable program code comprising instructions that, when executed by a processor, causes the processor to receive inputs from a first user type, via a first input unit, for generating one or more garment types in a graphical format. Further, a 3D avatar of a second user type is generated in a semi-automatic manner or an automatic manner based on capturing a first input type or a second input type respectively received via a second input unit. The first input type comprises measurements of body specifications of the second user type and the second input type comprises body images of the second user type. Further, inputs from a first user type are received, via a first input unit, for generating one or more garment types in a graphical format.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for improved generation of avatars for virtual try-on of garments. In particular, the present invention provides for generation of human models in the form of a 3D avatar for virtual try-on of garments in an online mode and an offline mode via an actionable User Interface (UI). The present invention provides for a system and a method for generating avatar of users with accurate body specifications. Further, the present invention provides for a system and a method for efficiently capturing inputs from users for avatar generation. Further, the present invention provides for a system and a method for efficient comparison of garments using the virtual-try on technique. Furthermore, the present invention provides for a system and a method for effective rendering of garments on user's 3D avatar by using at least body specifications and 2D images of user. Furthermore, the present invention provides for rendering the virtual garment on to 3D model of the user's avatar for virtual try-on. Yet further, the present invention provides for virtual-try on of garments before buying, trying at any location, saving time of the user before purchasing garments, collaboration of one user with other users, better user experience, analyzing user's preferences, customizing garments and building interest around the garments.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
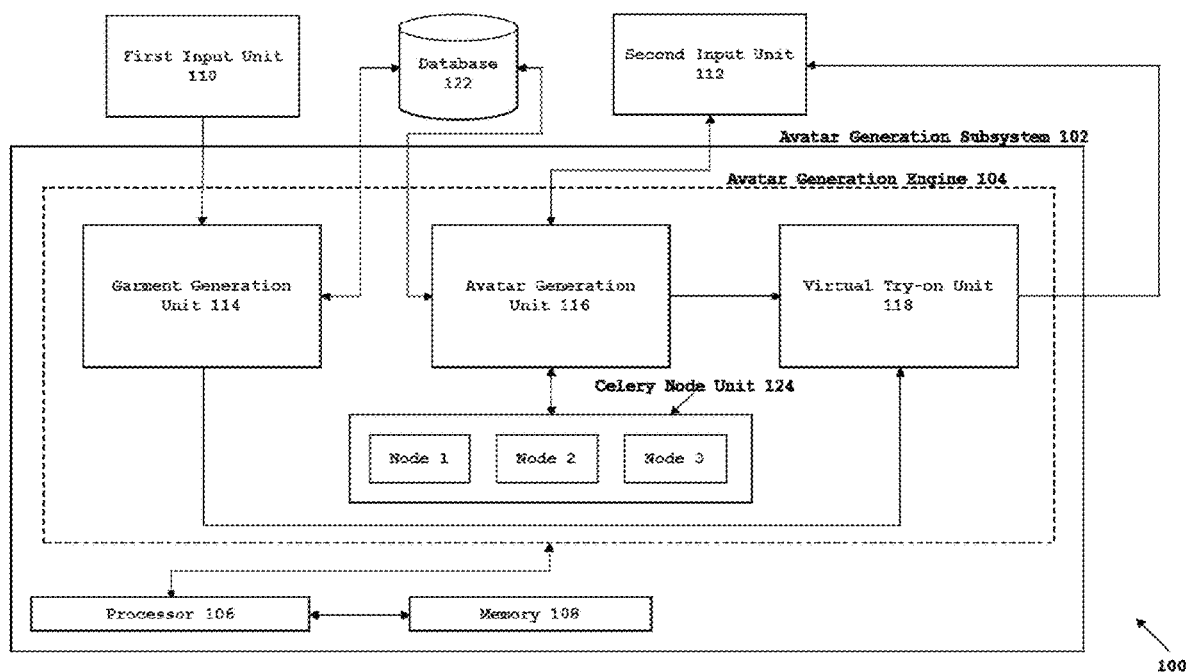
FIG. 1 is a detailed block diagram of a system for providing improved generation of avatars for virtual try-on of garments, in accordance with an embodiment of the present invention.

FIG. 1 is a detailed block diagram of a system 100 for providing improved generation of avatars for virtual try-on of garments, in accordance with an embodiment of the present invention. Referring to FIG. 1, the system 100 comprises an avatar generation subsystem 102, a first input unit 110, a second input unit 112 and a database 122. The first input unit 110, the second input unit 112 and the database 122 communicate with the subsystem 102 via a communication network (not shown). The communication network (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a Local Area Network (LAN), a Metropolitan Area Network (MAN) and a Wide Area Network (WAN). In an embodiment of the present invention, the first input unit 110 is associated with a first user type and the second input unit 112 is associated with a second user type. The first user type, includes, but is not limited to, a garment designer. The second user type, includes, but is not limited to, a consumer (user). The database 122 may be located at a local location or remote location with respect to the subsystem 102. In an exemplary embodiment of the present invention, the database 122 is a MySQL based database.

In an embodiment of the present invention, the subsystem 102 is a platform which may be implemented in a cloud computing architecture in which data, applications, services, and other resources are stored and delivered through shared data-centers. In an exemplary embodiment of the present invention, the functionalities of the subsystem 102 are delivered to a user as Software as a Service (SaaS) or a Platform as a Service (PaaS) over the communication network (not shown).

In another embodiment of the present invention, the subsystem 102 is a platform which may be implemented as a client-server architecture. In this embodiment, a client terminal accesses a server hosting the subsystem 102 over a communication network. The client terminals may include but are not limited to a smart phone, a computer, a tablet, a Graphical User Interface (GUI), an Application Programming Interface (API), microcomputer or any other wired or wireless terminal. The server may be a centralized or a decentralized server.

In an embodiment of the present invention, the subsystem 102 is an intelligent self-optimization platform configured to employ cognitive techniques for improved avatar generation of the second user type. The cognitive techniques may include, but are not limited to, machine learning techniques and deep learning techniques. The subsystem 102 may be accessed via an actionable User Interface (UI) rendered on the first input unit 110 and the second input unit 112. In an exemplary embodiment of the present invention, the subsystem 102 is configured to operate based on an on-demand system approach such that the various functionalities of the subsystem 102 are provided to user at any point of time.

In an embodiment of the present invention, the subsystem 102 comprises an avatar generation engine 104, a processor 106 and a memory 108. The avatar generation engine 104 (the engine 104) includes various units which operate in conjunction with each other for providing improved generation of avatars for virtual try-on of garments. The various units of the engine 104 are operated via the processor 106 specifically programmed to execute instructions stored in the memory 108 for executing respective functionality of the units of the engine 104, in accordance with various embodiments of the present invention.

In an embodiment of the present invention, the engine 104 comprises a garment generation unit 114, an avatar generation unit 116, a celery node unit 124 and a virtual try-on unit 118.

In an embodiment of the present invention, the garment generation unit 114 is configured to connect to the first input unit 110 for receiving inputs from the first user type for generating one or more garment types. The first input unit 110 includes, but is not limited to, a computer, a tablet, a laptop, a smartphone and a graphical user interface (GUI). The garment types include, but are not limited to, men's wear, women wear and kids wear. The garment types are of various designs, sizes and colors. Further, the garment types are of different materials, such as, but are not limited to, cotton, blended cotton, silk, nylon, polyester, natural fabrics, bamboo, lyocell, etc. In an embodiment of the present invention, the first input unit 110 is configured to generate the one or more garment types based on applying machine learning and deep learning techniques. The garment generation unit 114 is configured to render at least a web-based portal or application on the first input unit 110, via which the first user type uploads inputs for generating one or more garment types of various designs, for subsequent virtual try-on by the second user type. The inputs for generating one or more garment types are uploaded in at least a 2D image format and a 3D image format. Further, the uploaded inputs for generating the one or more garment types may include, but is not limited to, at least a fully stitched garment image, a 2D flat image of the garment or a 3D sketch image of the garment. In an embodiment of the present invention, the garment generation unit 114 is configured to apply various machine learning and deep learning techniques such as, Convolution Neural Networks (CNN) for processing the inputs from the first user type received via the first input unit 110 and for generating the one or more garment type in a graphical format.

In an embodiment of the present invention, the garment generation unit 114 is configured to communicate with the database 122 for storing the received first user type inputs and the generated one or more garment types in a data structure format for future retrieval of the stored inputs and the one or more generated garment types. In an exemplary embodiment of the present invention, the first user type may add material requirements for garment type components, mention key sizing requirements for the garment type components, add new garment types, edit the existing garment types stored in the database 122, via the first input unit 110. In an embodiment of the present invention, the edits to the generated garment types stored in the database 122 may include, but are not limited to, change in measurements for garment type components, change in material for garment type components and tweaks in design of the garment type. Further, the garment types stored in the database 122 are updated based on the edits carried out before being rendered to the second user type.

In an embodiment of the present invention, the avatar generation unit 116 is configured to generate an avatar of the second user type based on one or more inputs received from the second user type, via the second input unit 112. The second input unit 112 includes, but is not limited to, a smartphone, a laptop, a computer and a tablet. In an embodiment of the present invention, the avatar generation unit 116 is configured to render an interactive web application on the second input unit 112 for capturing one or more inputs from the second user type via the second input unit 112. The web application may be installed by the second user type on the second input unit 112. Further, the avatar generation unit 116 is configured with a 3D object management Application Programing Interface (API) for receiving the inputs from the second user type. In an exemplary embodiment of the present invention, the avatar generation unit 116 is configured to generate an avatar of the second user type in a semi-automatic manner. In another exemplary embodiment of the present invention, the avatar generation unit 116 is configured to generate an avatar of the second user type in an automatic manner.

In an embodiment of the present invention, the avatar generation unit 116 is configured to generate the 3D avatar of the second user type in the semi-automatic manner based on capturing a first input type inputted by the second user type via the second input unit 112. The avatar generation unit 116 is configured to generate the avatar of the second user type in the semi-automatic manner in an offline mode. In an embodiment of the present invention, the avatar generation unit 116 is configured to render the interactive web application on the second input unit 112 for sending a request to the second user type for capturing the first input type from the second user type. The second user type launches the web application on the second input unit 112 using a user ID associated with the second user type, for inputting the first input type. In an embodiment of the present invention, the first input type comprises measurements of body specifications of the second user type including, but are not limited to, chest size, bust size, waist size, hip size, height, arm length and inseam length. The body measurements are captured in at least centimeters (cm) or inches. The captured first input type is transmitted to the avatar generation unit 116 by the second input unit 112 using the 3D object management API. Further, the avatar generation unit 116 is configured to transmit the body measurements to the database 122 for storage and future retrieval.

In an embodiment of the present invention, the avatar generation unit 116 is configured to process the received first input type for generating the 3D avatar of the second user type in the offline mode. The generation of avatar of the second user type in the offline mode aids in providing privacy to the second user type along with an improved user experience. In an embodiment of the present invention, the avatar generation unit 116, subsequent to receiving the first input type from the second input unit 112, is configured to invoke the database 122 for fetching pre-stored one or more 3D body components models. The body components models are pre-generated using 3D body scanning techniques and pre-stored in the database 122. The body components models are stored in the database 122 with a pre-determined nomenclature. The body components models may include, but are not limited to, combination of a head model, an upper body model, a lower body model and an arm model.

In an embodiment of the present invention, the avatar generation unit 116 is further configured to transmit the received first input type along with the fetched body components models in the form of a first request to the celery node unit 124 for generating a full body 3D avatar of the second user type. The first request is transmitted asynchronously to the celery node unit 124 for generating the full body 3D avatar of the second user type. The celery node unit 124 is configured to process the received first input type and the body components models for generating the 3D avatar of the second user type. The celery node unit 124 using at least a node 1, a node 2 or a node 3 is configured to stitch together the received body components models (i.e. the head, upper body, lower body models and arms model) based on the first input type for generating the 3D avatar of the second user type by employing at least a blender technique. In an exemplary embodiment of the present invention, the celery node unit 124 is further configured to animate the generated 3D avatar of the second user type. In another exemplary embodiment of the present invention, the celery node unit 124 is configured to use at least 100 measurements of body specifications (first input type) of the second user type for accurately generating the avatar of the second user type.

In an embodiment of the present invention, subsequent to the generation of the 3D avatar of the second user type, the celery node unit 124 is configured to transmit the generated 3D avatar of the second user type to the avatar generation unit 116. The avatar generation unit 116 is configured to send an offline notification in the form of an email or a short messaging service (SMS) to the second user type for intimating the generation of the 3D avatar. The second user type may view the generated 3D avatar on the second input unit 112 via the installed interactive web application. Further, the generated 3D avatar of the second user type is modifiable. The second user type may be able to provide his/her requirements for modifying the generated 3D avatar. The second user type requirements may be transmitted to the celery node unit 124 for modifying the generated 3D avatar. Further, the generated avatar of the second user type is transmitted by the avatar generation unit 116 to the database 122 for storage and future retrieval.

Figure 2A:
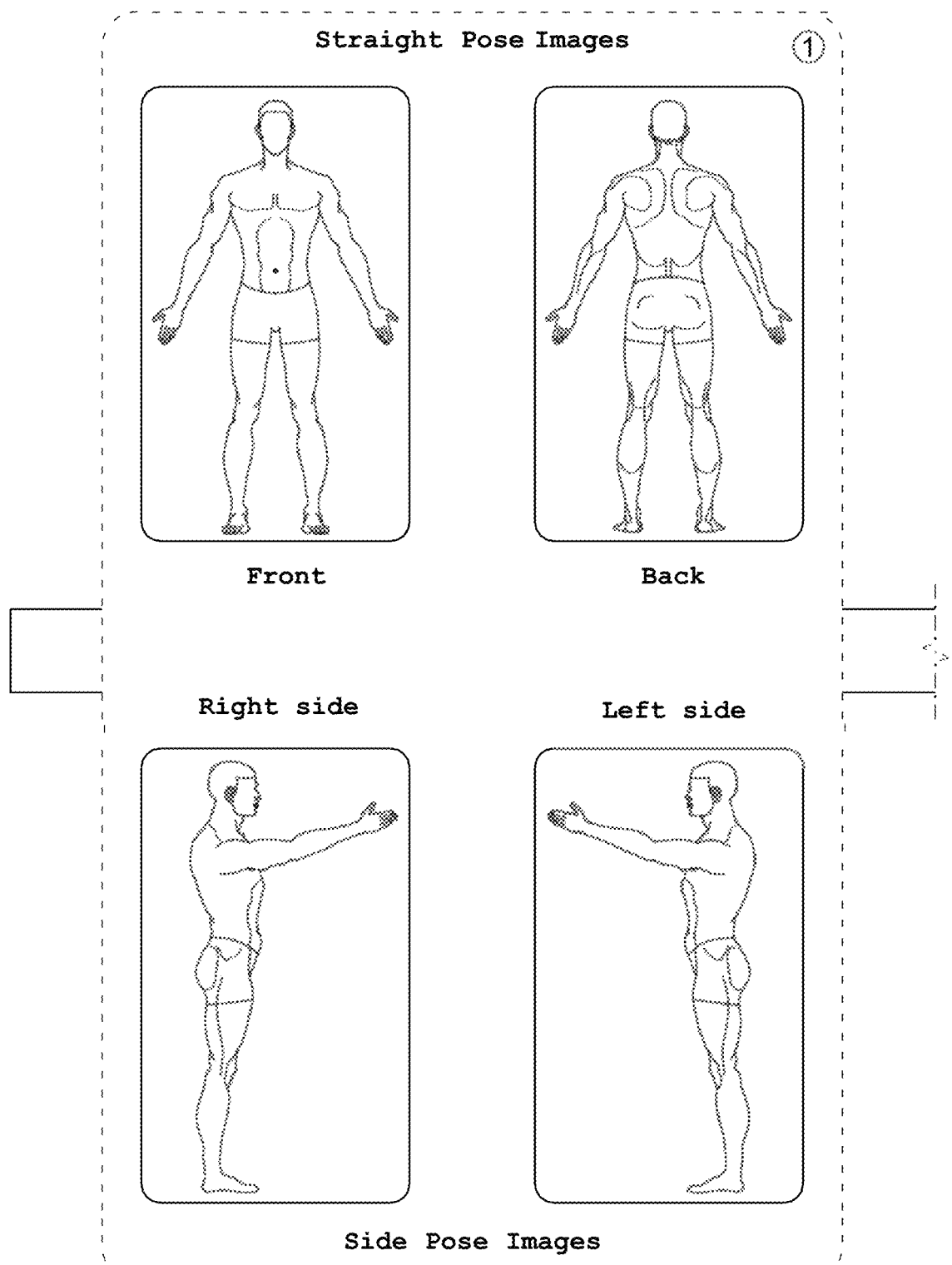
FIG. 2a illustrates acquisition patterns comprising a right side pose image and a left side pose image of a second user type and a front pose image and a back pose image of the second user type, in accordance with an embodiment of the present invention.

In another embodiment of the present invention, the avatar generation unit 116 is configured to generate the 3D avatar of the second user type in the automatic manner based on at least capturing a second input type inputted by the second user type via the second input unit 112. The avatar generation unit 116 is configured to generate 3D avatar of the second user type in the automatic manner based on applying at least digital image processing techniques and deep learning techniques. The avatar generation unit 116 is configured to generate the 3D avatar of the second user type in the automatic manner in an online mode and in real-time. In an embodiment of the present invention, the avatar generation unit 116 is configured to render the interactive web application on the second input unit 112 for sending a request to the second user type for capturing the second input type from the second user type. In an exemplary embodiment of the present invention, the second input type includes, but is not limited to, body images of the second user type captured from a camera present on the second input unit 112. In an embodiment of the present invention, the second user type initiates a full body scan, via the camera present on the second input unit 112, from different angles using the interactive web application installed on the second input unit 112 for capturing the second input type. The full body scan captures the one or more body images of the second user type in a 2D format. The captured one or more body images includes, but are not limited to, straight pose image, a side pose image and a face image of the second user type. In an embodiment of the present invention, the straight pose image comprises a front pose image and a back pose image of the second user type and the side pose image comprises a right side pose image and a left side pose image of the second user type and these pose images are further referred to as acquisition patterns, as illustrated in FIG. 2a. Further, the one or more images of the second user type are transmitted to the database 122 for storage and future retrieval.

In an embodiment of the present invention, the captured second input type of the second user type is transmitted to the avatar generation unit 116. The avatar generation unit 116 is configured to receive the second input type by employing a body measurement Application Programming Interface (API) for computing body measurements of the second user type associated with the second input type. The avatar generation unit 116 is configured to apply the digital image processing techniques and the deep learning techniques on the second input type of the second user type, which are in the 2D form, for computing one or more body measurements of the second user type. In an exemplary embodiment of the present, the avatar generation unit 116 is configured to apply digital image processing techniques and the deep learning techniques on at least the straight pose image and the side pose image present in the second input type for computing body measurements of the second user type.

In an embodiment of the present invention, the deep learning techniques applied by the avatar generation unit 116 comprises at least Convolutional Neural Network (CNN), Graph Neural Networks and Capsule Neural Network, having multiple layers. The avatar generation unit 116 is configured to parallelly apply the deep learning techniques on the second input type for computing the body measurements of the second user type. The deep learning technique which provide high accuracy in computation of the body measurements of the second user type is selected by the avatar generation unit 116 for respective implementation.

In an embodiment of the present invention, the avatar generation unit 116 is trained prior to the computation of the body measurements of the second user type by applying the deep learning techniques. The training of the avatar generation unit 116 is carried out using multiple datasets comprising sample sets related to multiple body measurements of the second user type, which are correlated with body images of the second user type. The body images include, but are not limited to, frontal, back, right-side and left-side body pose of the second user type. The body images may be captured using at least the camera on the second input unit 112 and from a video clip comprising the second user type. The body images may further relate to different skin types of the second user type. The body images may be at least color images and gray scale images. Further, noise from the images is removed prior to the training process.

Figure 2B:
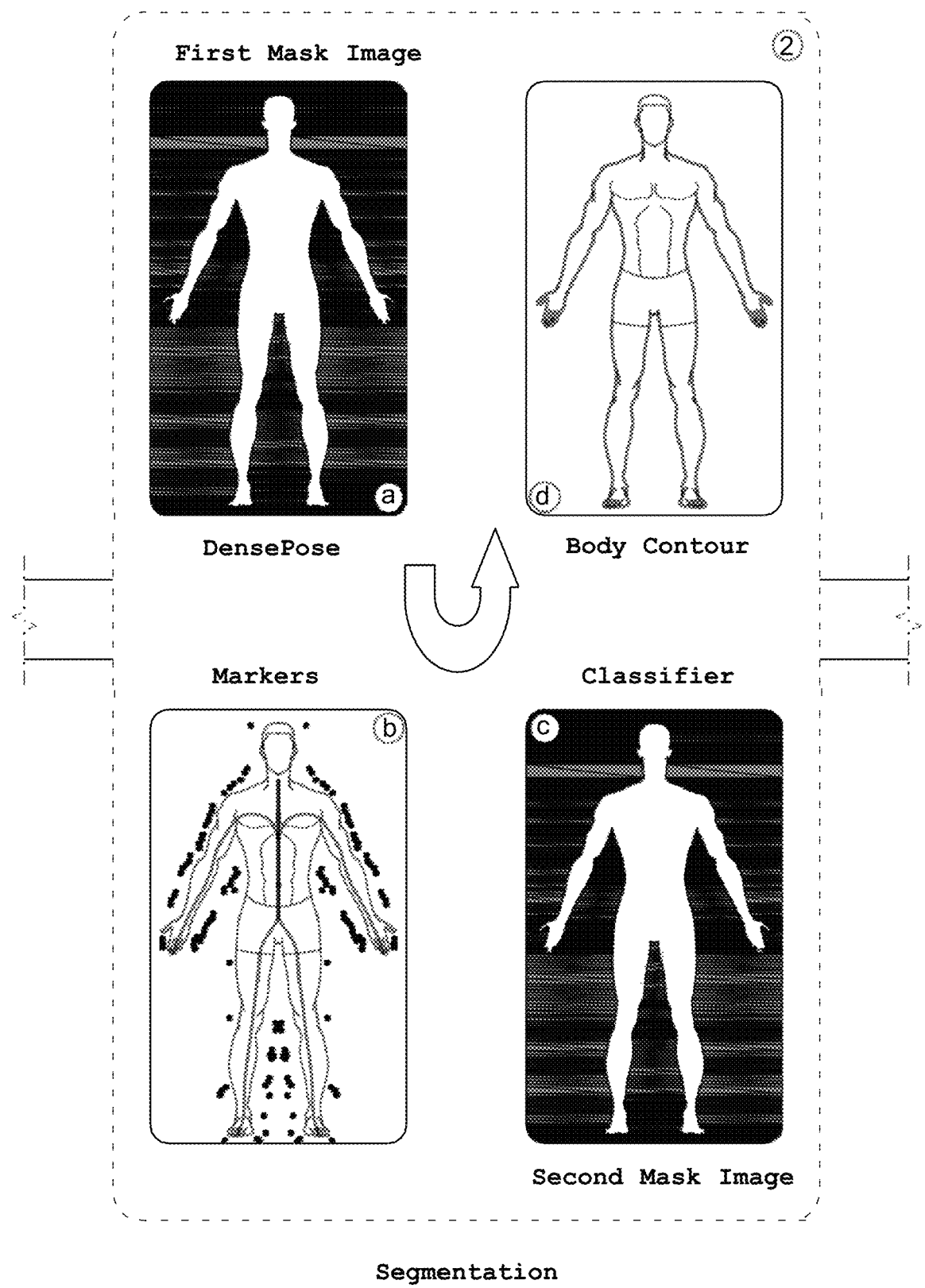
FIG. 2b illustrates a segmentation operation comprising a densepose image as a first mask image, a frontal pose image with markers around body image, a second mask image and a body contour image, in accordance with an embodiment of the present invention.

In an embodiment of the present invention, the trained avatar generation unit 116 is configured to compute the body measurements of the second user type. In an embodiment of the present invention, the avatar generation unit 116 is configured to carry out a segmentation operation by parallelly implementing the deep learning techniques on the second input type for computing the body measurements of the second user type. The segmentation operation aids in partioning the digital image into multiple segments for determining objects in the image and locating boundaries. As illustrated in FIG. 2b, the segmentation operation implemented by using the deep learning techniques, firstly a densepose image in the form of a first mask image is determined. The densepose image is used to detect and identify the entire human body in the second input type. Secondly, the frontal pose image is processed by the avatar generation unit 116 using the deep learning techniques for placing markers around the body image associated with the second input type for determining the body region. In an exemplary embodiment of the present invention, a Zhang-Suen thinning algorithm is used for placing markers around the body image associated with the second input type. Thirdly, the avatar generation unit 116 using the determined body region is configured to further apply the deep learning techniques for computing a classifier image as a second mask image. Lastly, external body contour image of the second user type is computed, by the avatar generation unit 116, by processing a segmented output image, as elaborated herein below.

Figure 3:
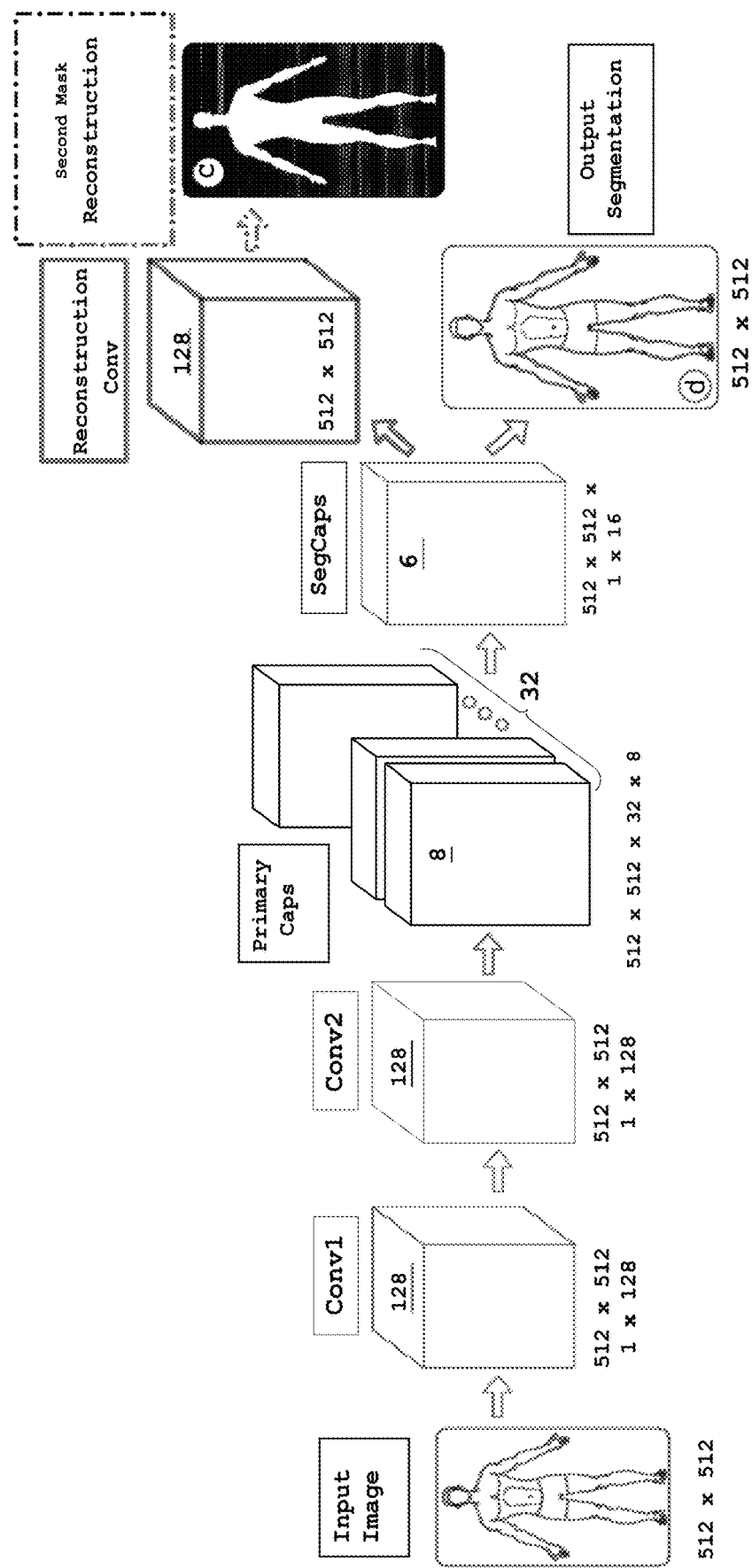
FIG. 3 illustrates a capsule convolution neural network (CapsNet) architecture, in accordance with an embodiment of the present invention.

In operation, in an exemplary embodiment of the present invention, a capsule neural network (CapsNet) is implemented by the avatar generation unit 116 for carrying out the segmentation operation and computing the body measurements of the second user type. As illustrated in FIG. 3, the CapsNet architecture comprises two convolutional layers (Conv1 and Conv2) and one fully connected layer. The CapsNet is firstly inputted with an image of a dimension '512×512' (height (H) and width (W)) providing the determined body portion of the second user type. Further, of the image is passed to the Conv1 layer. The Conv1 layer is of a dimension '512×512×1×128', wherein the Conv1 layer has 128, 9×9 convolution kernels with a stride of 1 and comprises a Rectified Linear Unit (ReLU) activation. Further, the output of the Conv1 layer is passed as an input to the Conv2. The Conv2 layer is of a dimension '512×512×1×128'. The Conv2 layer has 128, 9×9 convolution kernels with a stride of 1 and comprises the ReLU activation. The Conv1 layer and the Conv2 layer selects a pixel size of the body image and runs a window of a pre-determined size through the body image associated with the second input type, starting from left side and goes to the right side of the image, pixel by pixel, which converts pixel intensities to the activities of local feature detectors. The local features represent the body parts and the contours of the body. The running of window thereby, segments the body image into multiple small images, which are then combined together for determining an output image. Further, the output image from the Conv2 layer is provided as an input to a primary capsule layer of a dimension '512×512×32×8'. The primary capsules in the primary capsule layer are the lowest level of multi-dimensional entities and, from an inverse graphics perspective, activating the primary capsules corresponds to inverting the rendering process. Further, an output from the primary capsule layer is provided as an input to a segmentation capsule (SegCaps) layer. The Segcaps layer is of a dimension '512×512×1×16'. The SegCaps layer is configured to process the received input and provide an output to a reconstruction convolution layer having a dimension of '512×512×128' for generating the second mask image. The second mask image is a reconstructed image of the input image. In an embodiment of the present invention, the SegCaps layer is further configured to process the received input for computing the length of one or more vectors associated with the received input image for providing a segmented output image having a dimension of '512×512' for determining body measurements of the second user type. The SegCaps layer comprises a deep encoder-decoder architecture with skip connections, which concatenates capsule types from an earlier layer with the same spatial dimensions for computing the length of one or more vectors associated with the received input image.

In an embodiment of the present invention, the avatar generation unit 116 is configured to compute a capsule neural network (CapsNet) loss function ($l_k$), associated with a Capsule k, based on the following formula:

$$l_k = T_k \max(0, m^+ - \|s_k\|)^2 + \lambda(1 - T_k)\max(0, \|s_k\| - m^-)^2$$

wherein, $T_k$ is 1 whenever the class k is present and 0 otherwise; m+, m−, and λ are the hyper parameters of the CapsNet; and the final loss is the summation of multiple $l_k$s.

In an embodiment of the present invention, subsequent to application of the segmentation operation, the avatar generation unit 116 is configured to apply one or more classification techniques on the segmented output image for computing an external body contour image of the second user type. The computed body contour image aids in determining the body measurements of the second user type. In an exemplary embodiment of the present invention, the classification techniques comprise Bayesian, k-Nearest Neighbors (k-NN), Support Vector Machine (SVM), decision trees, adaptive boosting, random forest, Multilayer Perceptron (MLP) and expectation-maximization classifier. In an embodiment of the present invention, the classification technique, which provides high accuracy in computation of the body contours of the second user type is selected by the avatar generation unit 116 for respective implementation.

Figure 2C:
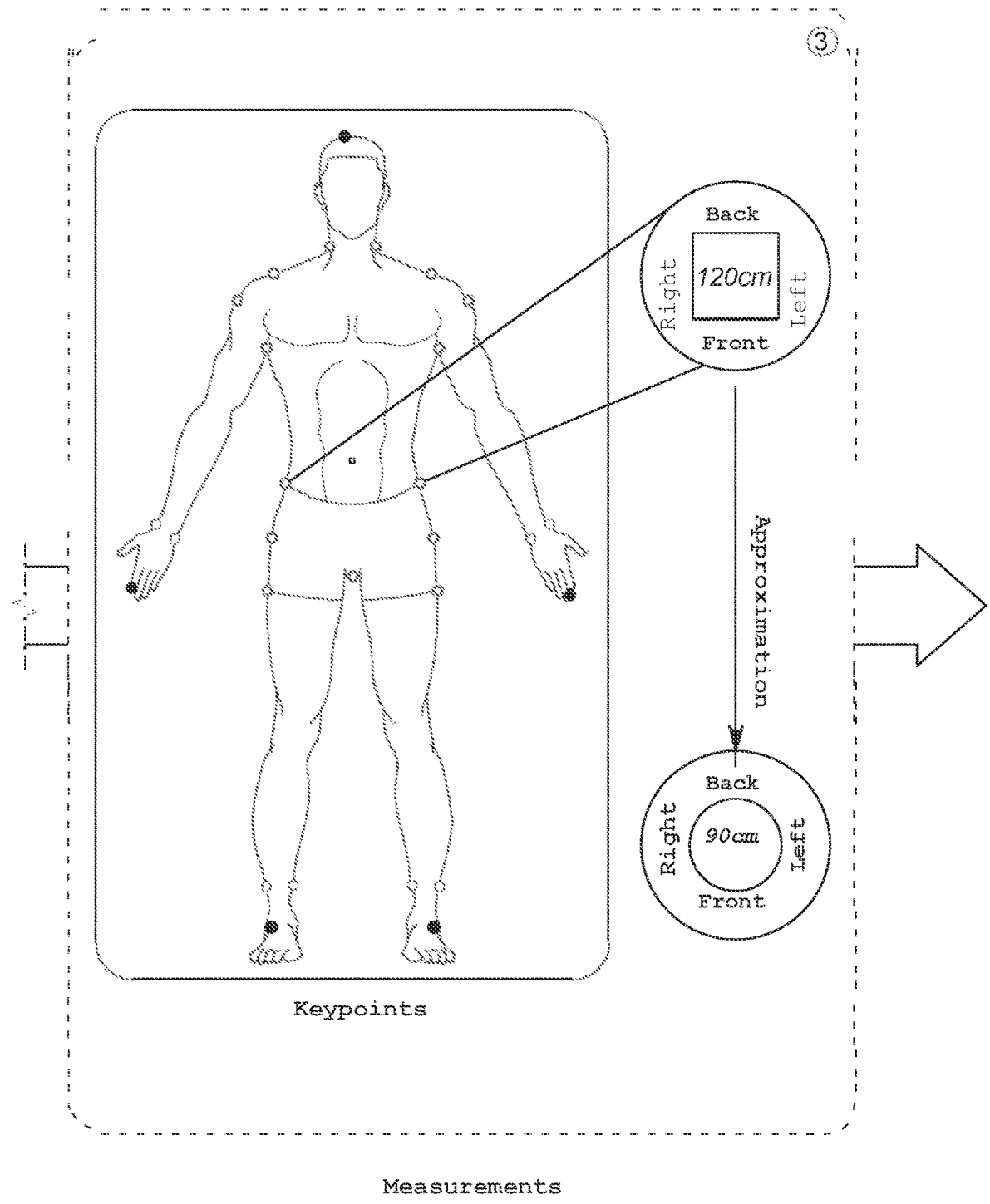
FIG. 2c illustrates extraction of one or more key points on a computed external body contour image, in accordance with an embodiment of the present invention.

In an embodiment of the present invention, the avatar generation unit 116 is configured to extract one or more key points on the computed external body contour image, as illustrated in FIG. 2c. In an embodiment of the present invention, the key points are extracted based on using at least one or more logic elements. For example, a maximum point between the right hand and the right foot is extracted or a maximum point between the right foot and the left foot is extracted. Similarly, maximum and minimum points are extracted for head and other body parts and the two points with the shortest distance from the two-to-two combination from the left and the right side of the body contour are used for extracting the key points. In an embodiment of the present invention, the avatar generation unit 116 is further configured to correlate the body images associated with the second input type using the second user type's height for accurately determining the body measurements of the second user type. In an embodiment of the present invention, the avatar generation unit 116 is configured to carry out an approximation operation on the determined body measurements for approximately computing the body measurements of the second user type, as illustrated in FIG. 2c. Advantageously, approximation operation aids in computing various perspectives of the body parts of the second user type. Further, the determined body measurements of the second user type are transmitted to the database 122 for storage and future retrieval.

In an embodiment of the present invention, the determined body measurements of the second user type are transmitted to the celery node unit 124 along with the face image of the second user type, in the form of a second request, by the avatar generation unit 116 for generating a full body avatar of the second user type in a 3D format. In an exemplary embodiment of the present invention, the second request is transmitted asynchronously to the celery node unit 124 for generating full body 3D avatar of the second user type. In an embodiment of the present invention, the celery node unit 124 is configured to process the received body measurements and the face image of the second user type for selecting a pre-stored base model from one or more pre-stored base models which is a nearest neighbor of a measurement in a 90 degrees dimension space (i.e. number of measurement returned by 3rd party API). The base model is representative of a human body 3D model with pre-defined measurements. The celery node unit 124 is further configured to apply at least a shrinking operation or an elongation operation on each measurement of the base model in accordance with the received body measurements of the second user type. Further, the celery node unit 124 selects the closest base human body 3D model such that the shrinking or elongation of measurements is not visible in the rendered full body 3D avatar of the second user type.

In an embodiment of the present invention, the celery node unit 124 is further configured to use a ball tree data structure for efficiently computing the nearest neighbor in the 90 degrees dimension space for selecting the base model. The ball tree data structure being a space partitioning data structure organizes base models in the 90 degrees dimension space. The ball tree data structure partitions the base models into a nested set of hyperspheres known as balls. The resultant data structure is used for carrying out nearest neighbor search efficiently based on generating a tree structure. The ball tree structure aids in determining the nearest human base model among the several possible base models based on determining the base models in the tree that are closest to a given base model by a distance metric. In an exemplary embodiment of the present invention, a Mahalanobis distance technique (i.e. the distance metric) is implemented by the celery node unit 124 for selecting the nearest base model from the several possible base models. The ball tree data structure aids in reducing the search space and time of search. In an exemplary embodiments of the present invention, at least 40 to 50 base models are generated by the celery node unit 124 in the 3D format using at least 90 body measurements of the second user type relating to at least, but not limited to, height, weight, body circumferences (waist, hip, and limbs), length of hands, legs and knee height. Further, the said measurements also include various angles to indicate the pose of the body of the second user type.

In an embodiment of the present invention, the celery node unit 124, subsequent to selecting the base model, is configured to generate the full body avatar of the second user type in the 3D format using at least the node 1, the node 2 or the node 3 based on the selected base model. In an embodiment of the present invention, the celery node unit 124 is configured to transmit the generated full body avatar of the second user type in the 3D format to the avatar generation unit 116, which then transmits the generated full body avatar of the second user type to the database 122 using the 3D object management API for storage and future retrieval. The full body avatar of the second user type is stored in the database 122 against the second user type's unique ID. Further, the avatar generation unit 116 is configured to trigger the API on the second input unit 112 for intimating the second user type on the generation of the full body avatar in 3D format by sending at least a notification on the interactive web application or an SMS and an email along with a link of the full body avatar of the second user type.

In an embodiment of the present invention, subsequent to generation of the garment types and the full body avatar of the second user type, the engine 104 is configured to invoke the virtual try-on unit 118 for fetching the generated garment types and the generated full body 3D avatar of the second user type (generated in at least semi-automatic manner or automatic manner) from the database 122 via the garment generation unit 114 and the avatar generation unit 116 respectively. The virtual try-on unit 118 is configured to render the fetched full body avatar of the second user type and the fetched garment types on the UI to the second user type for carrying out the virtual try-on operation based on using at least the blender technique. The second user type may select the garments on the UI and render the garments on the generated full body 3D avatar for carrying out the virtual try-on operation and visualize via the second input unit 112. The second user type may rotate the 3D avatar rendered with the garments in a 360° angle view to visualize and compare the rendered garments from various angles. Based on the fitting and design, the user may select or reject the rendered garment type on the 3D avatar.

Figure 4:
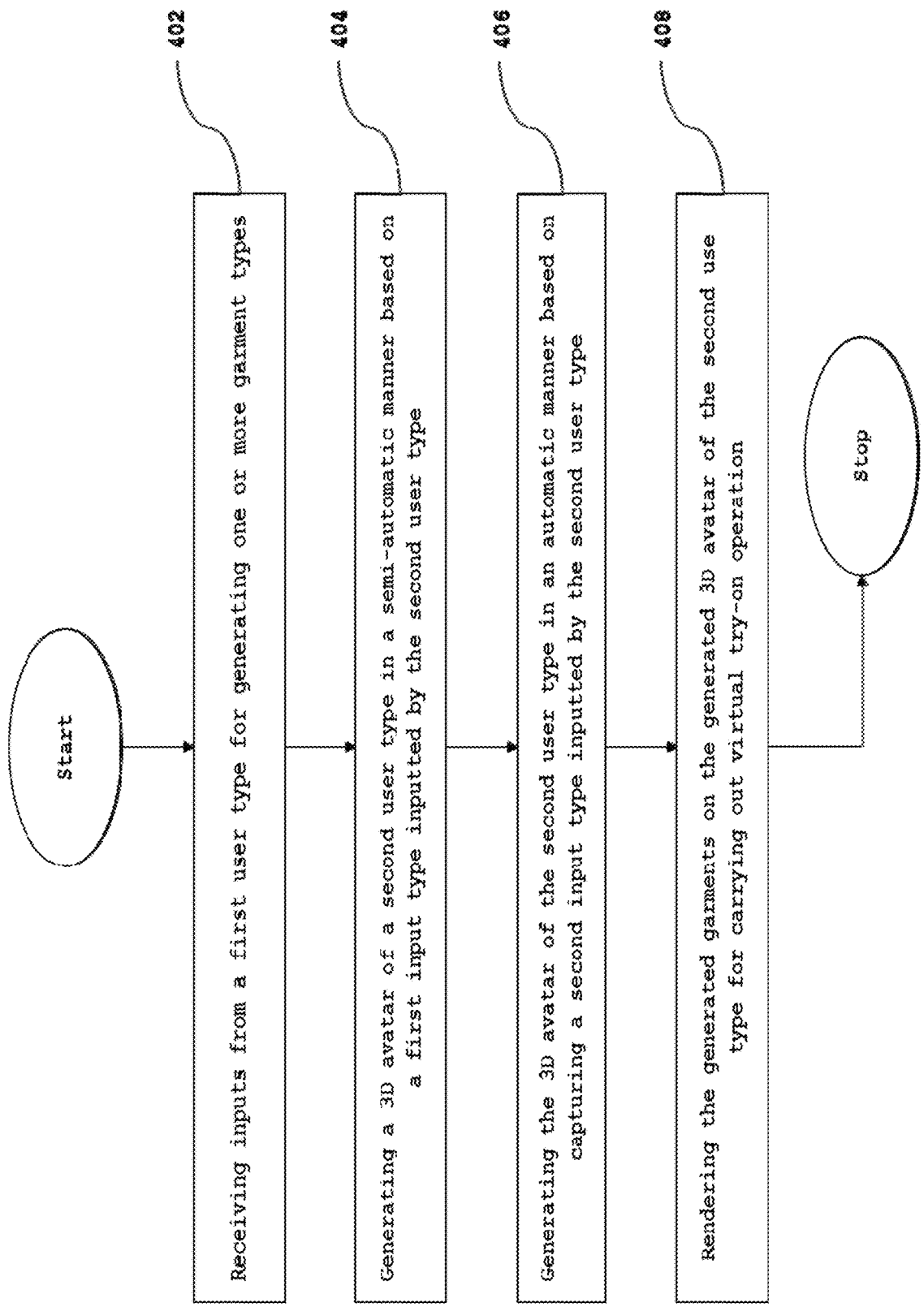
FIG. 4 is a flowchart illustrating a method for improved generation of avatars for virtual try-on of garments, in accordance with an embodiment of the present invention.

FIG. 4 is a flowchart illustrating a method for providing improved generation of avatars for virtual try-on of garments, in accordance with various embodiments of the present invention.

At step 402, inputs from a first user type are received for generating one or more garment types. In an embodiment of the present invention, the garment types include, but are not limited to, men's wear, women wear and kids wear. The garment types are of various designs, sizes and colors. Further, the garment types are of different materials, such as, but are not limited to, cotton, blended cotton, silk, nylon, polyester, natural fabrics, bamboo, lyocell, etc. In an embodiment of the present invention, the one or more garment types are generated based on applying machine learning and deep learning techniques. At least a web-based portal or application is rendered, via which the first user type uploads the inputs for generating one or more garment types of various designs, for subsequent virtual try-on by the second user type. The inputs for generating one or more garment types are uploaded in at least a 2D image format and a 3D image format. Further, the uploaded inputs for generating the one or more garment types may include, but is not limited to, at least a fully stitched garment image, a 2D flat image of the garment or a 3D sketch image of the garment. In an embodiment of the present invention, various machine learning and deep learning techniques such as, Convolution Neural Networks (CNN) are applied for processing the inputs received from the first user type and for generating the one or more garment type in a graphical format.

In an embodiment of the present invention, the received first user type inputs and the generated one or more garment types are stored in a data structure format in a database for future retrieval of the stored inputs and the one or more generated garment types. In an exemplary embodiment of the present invention, the first user type may add material requirements for garment type components, mention key sizing requirements for the garment type components, add new garment types, edit the existing garment types stored in the database. In an embodiment of the present invention, the edits to the generated garment types stored in the database may include, but are not limited to, change in measurements for garment type components, change in material for garment type components and tweaks in design of the garment type. Further, the garment types stored in the database are updated based on the edits carried out before being rendered to the second user type.

At step 404, a 3D avatar of a second user type is generated in a semi-automatic manner based on a first input type inputted by the second user type. In an embodiment of the present invention, the 3D avatar of the second user type is generated in the semi-automatic manner based on capturing a first input type inputted by the second user type. The avatar of the second user type is generated in the semi-automatic manner in an offline mode. In an embodiment of the present invention, an interactive web application is rendered for sending a request to the second user type for capturing the first input type from the second user type. The second user type launches the web application based on using a user ID associated with the second user type, for inputting the first input type. In an embodiment of the present invention, the first input type comprises measurements of body specifications of the second user type including, but are not limited to, chest size, bust size, waist size, hip size, height, arm length and inseam length. The body measurements are captured in at least centimeters (cm) or inches. The captured first input type is transmitted using a 3D object management API. Further, the body measurements are transmitted to the database for storage and future retrieval.

In an embodiment of the present invention, the first input type is processed for generating the 3D avatar of the second user type in the offline mode. In an embodiment of the present invention, subsequent to receiving the first input type, the database is invoked for fetching the pre-stored one or more body components models. The body components models are pre-generated using 3D body scanning techniques and pre-stored in the database. The body components models are stored in a database with a pre-defined nomenclature. The body components models may include, but are not limited to, combination of a head model, an upper body model, a lower body model and an arm model.

In an embodiment of the present invention, the received first input type along with the fetched body components models are transmitted in the form of a first request to a celery node unit for generating a full body 3D avatar of the second user type. The first request is transmitted asynchronously to the celery node unit for generating the full body 3D avatar of the second user type. The celery node unit processes the received first input type and the body components models for generating the 3D avatar of the second user type. In an exemplary embodiment of the present invention, the celery node unit using at least a node 1, a node 2 or a node 3 is configured to stitch together the received body components models (i.e. the head, upper body, lower body models and arms model) based on the first input type for generating the 3D avatar of the second user type by employing at least a blender technique. In an exemplary embodiment of the present invention, the celery node unit 124 is further configured to animate the generated 3D avatar of the second user type. In another exemplary embodiment of the present invention, the celery node unit uses at least 100 measurements of body specifications (first input type) of the second user type for accurately generating the avatar of the second user type.

In an embodiment of the present invention, subsequent to the generation of the 3D avatar of the second user type, an offline notification in the form of an email or a short messaging service (SMS) is sent to the second user type for intimating the generation of the 3D avatar. The second user type may view the generated 3D avatar via the installed interactive web application. Further, the generated 3D avatar of the second user type is modifiable. Further, the second user type may be able to provide his/her requirements for modifying the generated 3D avatar. The second user type requirements may be transmitted to the celery node unit for modifying the generated 3D avatar. Further, the generated avatar of the second user type is transmitted to the database for storage and future retrieval.

At step 406, the 3D avatar of the second user type is generated in an automatic manner based on capturing a second input type inputted by the second user type. In an embodiment of the present invention, 3D avatar of the second user type is generated in the automatic manner based on applying at least digital image processing techniques and deep learning techniques. The 3D avatar of the second user type is generated in the automatic manner in an online mode and in real-time. In an embodiment of the present invention, the interactive web application is rendered for sending a request to the second user type for capturing the second input type from the second user type. In an exemplary embodiment of the present invention, the second input type includes, but is not limited to, body images of the second user type captured from a camera. In an embodiment of the present invention, the second user type initiates a full body scan, via the camera present on the second input unit, from different angles using the interactive web application for capturing the second input type. The full body scan captures the one or more body images of the second user type in a 2D format. The captured one or more body images includes, but are not limited to, straight pose image, a side pose image and a face image of the second user type. In an embodiment of the present invention, the straight pose image comprises a front pose image and a back pose image of the second user type and the side pose image comprises a right side pose image and a left side pose image of the second user type and these pose images are further referred to as acquisition patterns. Further, the one or more images of the second user type are transmitted to the database for storage and future retrieval.

In an embodiment of the present invention, the second input type is received by employing a body measurement Application Programming Interface (API) for computing body measurements of the second user type associated with the second input type. The digital image processing techniques and the deep learning techniques are applied on second input type of the second user type, which are in the 2D form for computing one or more body measurements of the second user type. In an exemplary embodiment of the present, the digital image processing techniques and the deep learning techniques are applied on at least the straight pose image and the side pose image present in the second input type for computing body measurements of the second user type.

In an embodiment of the present invention, the deep learning techniques comprises at least Convolutional Neural Network (CNN), Graph Neural Networks and Capsule Neural Network, having multiple layers. The deep learning techniques are parallelly applied on the second input type for computing the body measurements of the second user type. The deep learning technique which provides high accuracy in computation of the body measurements of the second user type is selected for respective implementation.

In an embodiment of the present invention, training is carried out prior to the computation of the body measurements of the second user type by applying the deep learning techniques. The training is carried out using multiple datasets comprising sample sets related to multiple body measurements of the second user type, which are correlated with body images of the second user type. The body images include, but are not limited to, frontal, back, right-side and left-side body pose of the second user type. The body images may be captured using at least the camera and from a video clip comprising the second user type. The body images may be at least color and gray scale images. The body images may further relate to different skin types of the second user type. Further, noise from the images is removed prior to the training process.

In an embodiment of the present invention, subsequent to training, the body measurements of the second user type are computed. In an embodiment of the present invention, segmentation operation is carried out by parallelly implementing the deep learning techniques on the second input type for computing the body measurements of the second user type. In the segmentation operation, implemented by using the deep learning techniques, firstly a densepose image in the form of a first mask image is determined. The densepose image is used to detect and identify the entire human body in the second input type. Secondly, the frontal pose image is processed using the deep learning techniques for placing markers around the body image associated with the second input type for determining the body region. In an exemplary embodiment of the present invention, a Zhang-Suen thinning algorithm is used for placing markers around the body image associated with the second input type. Thirdly, the deep learning techniques are applied for computing a classifier image a second mask image, using the determined body region. Lastly compute an external body contour image of the second user type by processing a segmented output image, as elaborated herein below.

In an exemplary embodiment of the present invention, a capsule neural network (CapsNet) is implemented for carrying out the segmentation operation and computing the body measurements of the second user type. The CapsNet architecture comprises two convolutional layers (Conv1 and Conv2) and one fully connected layer. The CapsNet is firstly inputted with an image of a dimension '512×512' (height (H) and width (W)) providing the determined body portion of the second user type. Further, the image is passed to the Conv1 layer. The Conv1 is of a dimension '512×512×1× 128', wherein the Conv1 layer has 128, 9×9 convolution kernels with a stride of 1 and comprises a Rectified Linear Unit (ReLU) activation. Further, the output of the Conv1 layer is passed as an input to the Conv2. The Conv2 layer is of a dimension '512×512×1×128'. The Conv2 layer has 128, 9×9 convolution kernels with a stride of 1 and comprises the ReLU activation. The Conv1 layer and the Conv2 layer selects a pixel size of the body image and runs a window of a pre-determined size through the body image associated with the second input type, starting from left side and goes to the right side of the image, pixel by pixel, which converts pixel intensities to the activities of local feature detectors. The local features represent the body parts and the contours of the body. The running of window thereby, segments the body image into multiple small images, which are then combined together for determining an output image. Further, the output image from the Conv2 layer is provided as an input to a primary capsule layer of a dimension '512×512× 32×8'. The primary capsules in the primary capsule layer are the lowest level of multi-dimensional entities and, from an inverse graphics perspective, activating the primary capsules corresponds to inverting the rendering process. Further, an output from the primary capsule layer is provided as an input to a segmentation capsule (SegCaps) layer. The Segcaps layer is of a dimension '512×512×1×16'. The SegCaps layer is configured to process the received input and provide an output to a reconstruction convolution layer having a dimension of '512×512×128' for generating the second mask image. The second mask image is a reconstructed image of the input image. In an embodiment of the present invention, the SegCaps layer is further configured to process the received input for computing the length of one or more vectors associated with the received input image for providing a segmented output image having a dimension of '512×512' for determining body measurements of the second user type. The SegCaps layer comprises a deep encoder-decoder architecture with skip connections, which concatenates capsule types from an earlier layer with the same spatial dimensions for computing the length of one or more vectors associated with the received input image.

In an embodiment of the present invention, a capsule neural network (CapsNet) loss function ($l_k$), associated with a Capsule k, is computed based on the following formula:

$$l_k = T_k \max(0, m^+ - \|s_k\|)^2 + \lambda(1-T_k)\max(0, \|s_k\| - m^-)^2$$

wherein, $T_k$ is 1 whenever the class k is present and 0 otherwise; m+, m−, and λ are the hyper parameters of the CapsNet; and the final loss is the summation of multiple $l_k$s.

In an embodiment of the present invention, subsequent to application of the segmentation operation, one or more classification techniques are applied on the segmented output image for computing an external body contour image of the second user type. The computed body contour image aids in determining the body measurements of the second user type. In an exemplary embodiment of the present invention, the classification techniques comprise Bayesian, k-Nearest Neighbors (k-NN), Support Vector Machine (SVM), decision trees, adaptive boosting, random forest, Multilayer Perceptron (MLP) and expectation-maximization classifier. In an embodiment of the present invention, the classification technique which provides high accuracy in computation of the body contours of the second user type is selected for respective implementation.

In an embodiment of the present invention, one or more key points on the computed external body contour image are extracted, subsequent to the computation of the external body contour image. In an embodiment of the present invention, the key points are extracted based on using at least one or more logic elements. For example, a maximum point between the right hand and the right foot is extracted or a maximum point between the right foot and the left foot is extracted. Similarly, maximum and minimum points are extracted for head and other body parts and the two points with the shortest distance from the two-to-two combination from the left and the right side of the body contour are used for extracting the key points. In an embodiment of the present invention, the body images associated with the second input type are correlated, using the second user type's height for accurately determining the body measurements of the second user type. In an embodiment of the present invention, an approximation operation is carried out on the determined body measurements for approximately computing the body measurements of the second user type. Further, the determined body measurements of the second user type are transmitted to the database for storage and future retrieval.

In an embodiment of the present invention, the determined body measurements of the second user type are transmitted to the celery node unit along with the face image of the second user type, in the form of a second request, for generating a full body avatar of the second user type in a 3D format. In an exemplary embodiment of the present invention, the second request is transmitted asynchronously to the celery node unit for generating full body 3D avatar of the second user type. In an embodiment of the present invention, the celery node unit processes the received body measurements and the face image of the second user type for selecting a pre-stored base model, from one or more pre-stored base models, which is a nearest neighbor of a measurement in a 90 degrees dimension space (i.e. number of measurement returned by 3rd party API) for generating a full body 3D avatar of the second user type. The base model is representative of a human body 3D model with pre-defined measurements. The celery node unit further applies a shrinking operation or an elongation operation on each measurement of the base model in accordance with the received body measurements of the second user type. Further, the celery node unit selects the closest base human body 3D model such that the shrinking or elongation of measurements is not visible in the rendered full body 3D avatar of the second user type.

In an embodiment of the present invention, the celery node unit further uses a ball tree data structure for efficiently computing the nearest neighbor in the 90 degrees dimension space for selecting the based model. The ball tree data structure being a space partitioning data structure organizes base models in the 90 degrees dimension space. The ball tree data structure partitions the base models into a nested set of hyperspheres known as balls. The resultant data structure is used for carrying out nearest neighbor search efficiently based on generating a tree structure. The ball tree structure aids in determining the nearest human base model among the several possible base models based on determining the base models in the tree that are closest to a given base model by a distance metric. In an exemplary embodiment of the present invention, a Mahalanobis distance technique (i.e. the distance metric) is implemented by the celery node unit for selecting the nearest base model from the several possible base models. In an exemplary embodiments of the present invention, at least 40 to 50 base models are generated by the celery node unit in the 3D format using at least 90 body measurements of the second user type relating to at least, but not limited to, height, weight, body circumferences (waist, hip, and limbs), length of hands, legs and knee height. Further, the said measurements also include various angles to indicate the pose of the body of the second user type.

In an embodiment of the present invention, the celery node unit, subsequent to selecting the base model, generates the full body avatar of the second user type in the 3D format using at least the node 1, the node 2 or the node 3 based on the selected base model. In an embodiment of the present invention, the celery node unit transmits the generated full body avatar of the second user type in the 3D format to the database using the 3D object management API for storage and future retrieval. The full body avatar of the second user type is stored in the database against the second user type's unique ID. Further, an API is triggered for intimating the second user type on the generation of the full body avatar in 3D format by sending at least a notification on the interactive web application or an SMS and an email along with a link of the full body avatar of the second user type.

At step 408, the generated garments are rendered on the generated 3D avatar of the second user type for carrying out virtual try-on operation. In an embodiment of the present invention, subsequent to generation of the garment types and the full body avatar of the second user type, the generated garment types and the generated full body 3D avatar of the second user type (generated in at least semi-automatic manner or automatic manner) are fetched from the database. The fetched full body avatar of the second user type and the fetched garment types are rendered on a UI to the second user type for carrying out the virtual try-on operation based on using at least the blender technique. The second user type may select the garments on the UI and render the garments on the generated full body 3D avatar for carrying out the virtual try-on operation and visualization. The second user type may rotate the 3D avatar rendered with the garments in a 360° angle view to visualize and compare the rendered garments from various angles. Based on the fitting and design, the user may select or reject the rendered garment type on the 3D avatar.

Advantageously, in various embodiments of the present invention, the system 100 and the method is configured to provide improved generation of avatars for virtual try-on of garments. The present invention provides for generation of 3D avatar of users for virtual try-on of garments in the online mode and the offline mode via the actionable UI. The present invention provides for generating avatars of the users with accurate body specifications based on efficiently capturing inputs from users for avatar generation. The present invention provides for effectively comparison of garments using the virtual-try on operation. Further, the present invention provides for effectively rendering the garment on user's 3D avatar using at least the body specifications and 2D images of the user. Furthermore, the present invention provides for virtual-try on of garments before buying, trying at any location, saving time of the second user type before purchasing garments, collaboration of one second user type with other, better user experience, analyzing user's preferences, customizing garments and building interest around the garments.

Figure 5:
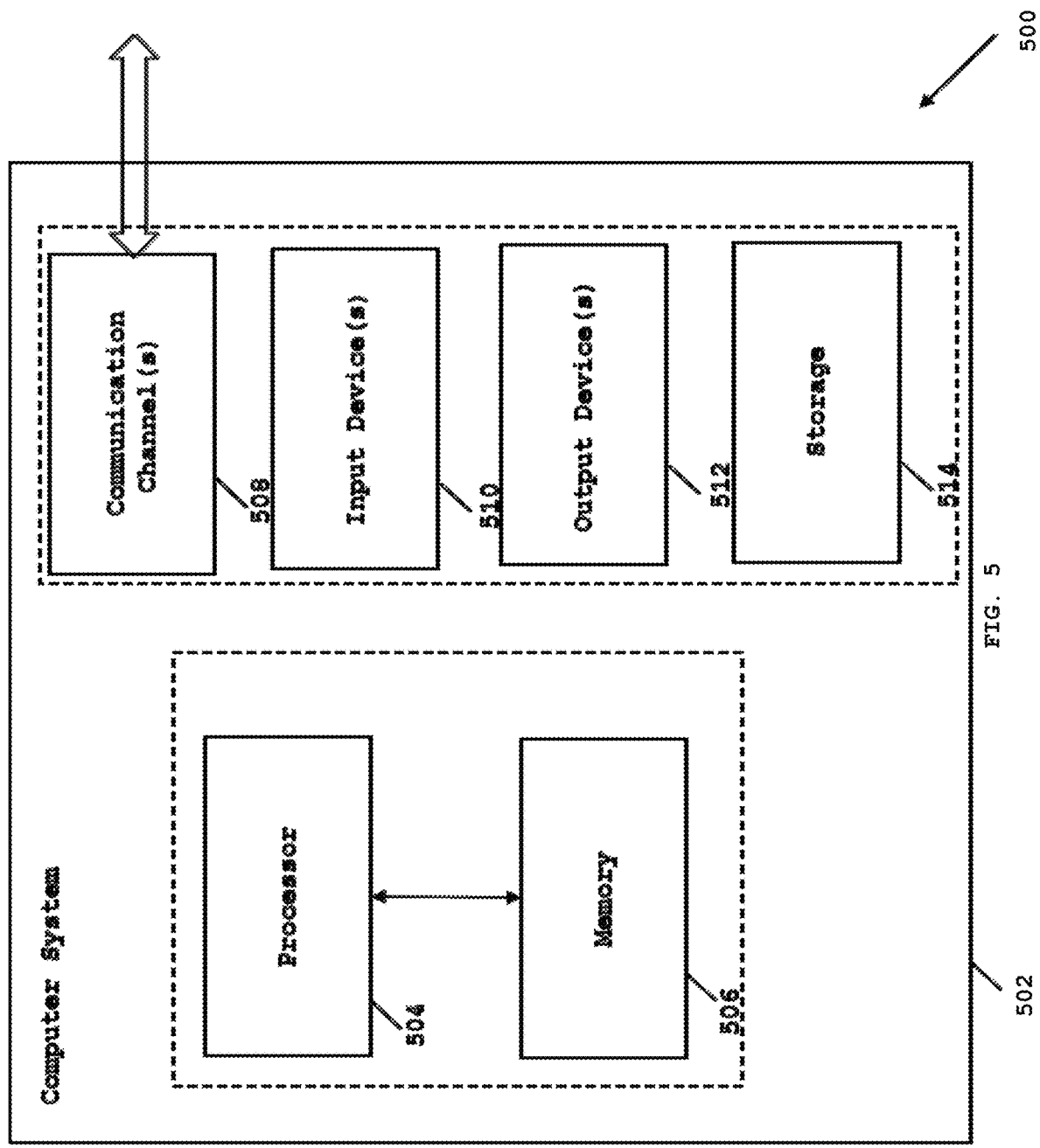
FIG. 5 illustrates an exemplary computer system in which various embodiments of the present invention may be implemented.

FIG. 5 illustrates an exemplary computer system in which various embodiments of the present invention may be implemented. The computer system 502 comprises a processor 504 (106, FIG. 1) and a memory 506 (108, FIG. 1). The processor 504 (106, FIG. 1) executes program instructions and is a real processor. The computer system 502 is not intended to suggest any limitation as to scope of use or functionality of described embodiments. For example, the computer system 502 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 506 (108, FIG. 1) may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 510 may include, but not limited to, a keyboard, mouse, pen, joystick, trackball, a voice device, a scanning device, touch screen or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for improved generation of 3D avatars for virtual try-on of garments, the system comprises:
   a memory storing program instructions;
   a processor executing the instructions stored in the memory; and
   an avatar generation engine executed by the processor and configured to:
   receive inputs from a first user type, via a first input unit, for generating one or more garment types in a graphical format, wherein the inputs for generating the one or more garment types comprises a fully stitched garment image, a 2D flat image of the garment or a 3D sketch image of the garment;
   generate a 3D avatar of a second user type by capturing a first input type and a second input type respectively received via a second input unit, wherein the first input type comprises measurements of body specifications of the second user type and the second input type comprises body images of the second user type captured from different angles via a camera present on the second input unit in a 2D format and received by employing a body measurement Application Programming Interface (API),
   wherein the 3D avatar of the second user type is generated by parallelly implementing a combination of deep learning techniques including Convolutional Neural Network (CNN) technique, a Graph Neural Network technique and a Capsule Neural Network technique on the second input type, selecting the technique that provides a high accuracy for computing one or more body measurements of the second user type to obtain a segmented output image, implementing a combination of classification techniques on the segmented output image including Bayesian, k-Nearest Neighbors (k-NN), Support Vector Machine (SVM), decision trees, adaptive boosting, random forest, Multilayer Perceptron (MLP) and expectation-maximization classifier, selecting the classification technique that provides a high accuracy in computation of body contours of the second user type for computing an external body contour image of the second user type, and extracting one or more key points from the computed external body contour image of the second user type, and wherein the Graph Neural Network technique is implemented to process the extracted one or more key points for determining the body measurements of the second user type; and
   render the generated garment types on the generated 3D avatar of the second user type for carrying out a virtual try-on operation.

2. The system as claimed in claim 1, wherein the avatar generation engine comprises a garment generation unit executed by the processor and configured to apply machine learning and deep learning techniques for processing the inputs received from the first user type and generating the one or more garment type in the graphical format.

3. The system as claimed in claim 2, wherein the garment generation unit is configured to communicate with a database for storing the received inputs from the first user type and the generated one or more garment types in a data structure format, and wherein the generated garment types stored in the database are capable of being edited, the edits comprising change in measurements for garment type components, change in material for garment type components and tweaks in design of the garment type.

4. The system as claimed in claim 1, wherein the avatar generation engine comprises an avatar generation unit executed by the processor and is configured to render an interactive web application on the second input unit for capturing the first input type and the second input type via the second input unit, and wherein the avatar generation unit is configured to render the interactive web application on the second input unit for sending a request to the second user type for capturing the first input type and the second input type.

5. The system as claimed in claim 1, wherein the avatar of the second user type is generated in a semi-automatic manner in an offline mode.

6. The system as claimed in claim 1, wherein the measurements of the body specifications of the second user type comprises chest size, bust size, waist size, hip size, height, arm length and inseam length.

7. The system as claimed in claim 4, wherein the captured first input type is transmitted to the avatar generation unit by the second input unit via a 3D object management Application Programming Interface (API).

8. The system as claimed in claim 1, wherein the generation of the 3D avatar of the second user type in a semi-automatic manner comprises the steps of:
   invoking a database for fetching pre-stored one or more 3D body components models, subsequent to receiving the first input type from the second input unit, and wherein the body components models comprises combination of a head model, an upper body model, a lower body model and an arm model;
   transmitting the received first input type along with the fetched body components models in the form of a first request to a celery node unit of the avatar generation engine, wherein the first request is transmitted asynchronously to the celery node unit;
   stitching together the received body components models, by the celery node unit, based on the first input type for generating the 3D avatar of the second user type by employing at least a blender technique, and wherein the celery node unit uses at least a node 1, a node 2 or a node 3 to stitch together the received body components models; and
   sending an offline notification to the second user type for intimating the generation of the 3D avatar, and wherein the generated 3D avatar of the second user type is modifiable.

9. The system as claimed in claim 1, wherein the avatar generation engine comprises an avatar generation unit executed by the processor and configured to generate the 3D avatar of the second user type in an automatic manner by applying at least digital image processing techniques and deep learning techniques, and wherein the 3D avatar of the second user type is generated in the automatic manner in an online mode and in real-time.

10. The system as claimed in claim 1, wherein the captured one or more body images comprises a straight pose image, a side pose image and a face image of the second user type, and wherein the straight pose image comprises a front pose image and a back pose image of the second user type and the side pose image comprises a right side pose image and a left side pose image of the second user type.

11. The system as claimed in claim 1, wherein the avatar generation unit is trained prior to the computation of the body measurements of the second user type by applying the deep learning techniques, and wherein the training of the avatar generation unit is carried out using multiple datasets comprising sample sets related to multiple body measurements of the second user type, which are correlated with body images of the second user type, and wherein the body images are captured using at least the camera on the second input unit and from a video clip comprising the second user type, and wherein the body images are at least color images, gray scale images and of different skin types of the second user type.

12. The system as claimed in claim 11, wherein the generation of the 3D avatar of the second user type in the automatic manner by an avatar generation unit of the avatar generation engine comprises the steps of:
    carrying out a segmentation operation to obtain the segmented output image by parallelly implementing the deep learning techniques on the second input type for computing body measurements of the second user type, wherein the segmentation operation partitions the image into multiple segments for determining objects in the image and locating boundaries, and wherein the segmentation operation comprises:
        determining a densepose image in the form of a first mask image, wherein the densepose image is used to detect and identify the entire human body in the second input type;
        processing a frontal pose image by using the deep learning techniques for placing markers around the body image associated with the second input type for determining the body region, wherein a Zhang-Suen thinning algorithm is used for placing markers around the body image associated with the second input type;
        computing a classifier image as a second mask image using the determined body region by apply the deep learning techniques;
        computing an external body contour image of the second user type by processing a segmented output image;
        extracting the one or more key points on the computed external body contour image, wherein the key points are extracted using at least one or more logic elements;
        correlating the body images associated with the second input type using the second user type's height for accurately determining the body measurements of the second user type; and
        carrying out an approximation operation on the determined body measurements for approximately computing the body measurements of the second user type;
    transmitting the determined body measurements of the second user type to a celery node unit of the avatar generation engine along with a face image of the second user type, in the form of a second request, for generating a full body avatar of the second user type in a 3D format, the second request is transmitted asynchronously to the celery node unit; and
    triggering an API on the second input unit for intimating the second user type on the generation of the full body avatar in 3D format by sending at least a notification on the interactive web application or an SMS and an email along with a link of the full body avatar of the second user type.

13. The system as claimed in claim 12, wherein a capsule neural network (CapsNet) is implemented by the avatar generation unit for carrying out the segmentation operation and computing the body measurements of the second user type, and wherein the CapsNet architecture comprises two convolutional layers (Conv1 and Conv2) and one fully connected layer.

14. The system as claimed in claim 13, wherein implementation of the CapsNet for carrying out the segmentation operation and computing the body measurements of the second user type comprises the steps of:
    inputting, to the CapsNet, an image of a dimension '512×512' (height (H) and width (W)) providing the determined body portion of the second user type;
    passing the image to the Conv1 layer of the CapsNet, wherein the Conv1 is of a dimension '512×512×1×128', and wherein the Conv1 layer has 128, 9×9 convolution kernels with a stride of 1 and comprises a Rectified Linear Unit (ReLU) activation;
    passing the output of the Conv1 layer as an input to the Conv2, wherein the Conv2 layer is of a dimension '512×512×1×128', and wherein the Conv2 layer has 128, 9×9 convolution kernels with the stride of 1 and comprises the ReLU activation;
    selecting by the Conv1 layer and Conv2 layer a pixel size of the body image and running a window of a predetermined size through the body image associated with the second input type, starting from left side and going to the right side of the image, pixel by pixel, which converts pixel intensities to the activities of local feature detectors, wherein running of window segments the body image into multiple small images which are combined together for determining an output image;
    providing the output image from the Conv2 layer as an input to a primary capsule layer of a dimension '512×512×32×8';
    providing an output from the primary capsule layer as an input to a segmentation capsule (SegCaps) layer, wherein the Segcaps layer is of a dimension '512×512×1×16';
    processing by the SegCaps layer the received input and providing an output to a reconstruction convolution layer having a dimension of '512×512×128' for generating the second mask image; and
    processing further by the SegCaps layer the received input image for computing length of one or more vectors associated with the received input image for providing a segmented output image having a dimension of '512×512' for determining body measurements of the second user type, and wherein a CapsNet loss function ($l_k$), associated with a Capsule k, is computed.

15. The system as claimed in claim 12, wherein processing of the second request by the celery node unit comprises the steps of:

selecting a pre-stored base model from one or more pre-stored base models which is a nearest neighbour of a measurement in a 90 degrees dimension space, wherein the base model is representative of a human body 3D model with pre-defined measurements;

applying at least a shrinking operation or an elongation operation on each measurement of the base model in accordance with the received body measurements of the second user type, wherein the celery node unit selects the closest base human body 3D model such that the shrinking or elongation of measurements is not visible in the rendered full body 3D avatar of the second user type;

using a ball tree data structure for efficiently computing the nearest neighbor in the 90 degrees dimension space for selecting the base model, wherein the ball tree structure provides determining the nearest human base model among the several base models based on determining the base models in the tree that are closest to a given base model by a distance metric, and wherein a Mahalanobis distance technique is implemented by the celery node unit as the distance metric for selecting the nearest base model from several base models;

generating the full body avatar of the second user type in the 3D format using at least a node 1, a node 2 or a node 3 based on the selected base model; and transmitting the generated full body avatar of the second user type in the 3D format to the avatar generation unit, and wherein the avatar generation unit is configured to transmit the generated full body avatar of the second user type to the database using the 3D object management API for storage and future retrieval.

16. The system as claimed in claim 1, wherein the avatar generation engine comprises a virtual try-on unit executed by the processor and configured to fetch the generated garment types and the generated full body 3D avatar of the second user type from a database via a garment generation unit and an avatar generation unit of the avatar generation engine respectively, and wherein the virtual try-on unit is configured to render the fetched full body avatar of the second user type and the fetched garment types on an User Interface (UI) of the second input unit to the second user type and carry out the virtual try-on operation based on using at least a blender technique, and wherein the full body 3D avatar rendered with the garments is rotatable in a 360° angle view to visualize and compare the rendered garments from various angles.

17. The method as claimed in claim 1, wherein the generated garment types and the generated full body 3D avatar of the second user type are fetched, and wherein the fetched full body avatar of the second user type and the fetched garment types are rendered on an User Interface (UI) to the second user type and carry out the virtual try-on operation based on using at least a blender technique, and wherein the full body 3D avatar rendered with the garments is rotatable in a 360° angle view to visualize and compare the rendered garments from various angles.

18. A method for improved generation of 3D avatars for virtual try-on of garments, the method is implemented by a processor executing program instructions stored in a memory, the method comprising:

receiving inputs from a first user type, via a first input unit, for generating one or more garment types in a graphical format, wherein the inputs for generating the one or more garment types comprises a fully stitched garment image, a 2D flat image of the garment or a 3D sketch image of the garment;

generating a 3D avatar of a second user type by capturing a first input type and a second input type respectively received via a second input unit, wherein the first input type comprises measurements of body specifications of the second user type and the second input type comprises body images of the second user type captured from different angles via a camera present on the second input unit in a 2D format and received by employing a body measurement Application Programming Interface (API), wherein the 3D avatar of the second user type is generated by parallelly implementing a combination of deep learning techniques including Convolutional Neural Network (CNN) technique, a Graph Neural Network technique and a Capsule Neural Network technique on the second input type, selecting the technique that provides a high accuracy for computing one or more body measurements of the second user type to obtain a segmented output image, implementing a combination of classification techniques on the segmented output image including Bayesian, k-Nearest Neighbors (k-NN), Support Vector Machine (SVM), decision trees, adaptive boosting, random forest, Multilayer Perceptron (MLP) and expectation-maximization classifier, selecting the classification technique that provides a high accuracy in computation of body contours of the second user type for computing an external body contour image of the second user type, and extracting one or more key points from the computed external body contour image of the second user type, and wherein the Graph Neural Network technique is implemented to process the extracted one or more key points for determining the body measurements of the second user type; and rendering the generated garment types on the generated 3D avatar of the second user type for carrying out a virtual try-on operation.

19. The method as claimed in claim 18, wherein an interactive web application is rendered for capturing the first input type and the second input type, and wherein the interactive web application is rendered for sending a request to the second user type for capturing the first input type and the second input type.

20. The method as claimed in claim 18, wherein the measurements of the body specifications of the second user type comprises chest size, bust size, waist size, hip size, height, arm length and inseam length.

21. The method as claimed in claim 18, wherein the generation of the 3D avatar of the second user type in a semi-automatic manner comprises the steps of:

fetching pre-stored one or more 3D body components models, subsequent to receiving the first input type from the second input unit, and wherein the body components models comprises combination of a head model, an upper body model, a lower body model and an arm model;

transmitting the received first input type along with the fetched body components models in the form of a first request to a celery node unit, wherein the first request is transmitted asynchronously to the celery node unit;

stitching together the received body components models, by the celery node unit, based on the first input type for generating the 3D avatar of the second user type by employing at least a blender technique; and wherein the celery node unit uses at least a node 1, a node 2 or a node 3 to stitch together the received body components models; and sending an offline notification to the second user type for intimating the generation of the 3D avatar, and wherein the generated 3D avatar of the second user type is modifiable.

22. The method as claimed in claim 18, wherein the 3D avatar of the second user type is generated in the automatic manner by applying at least digital image processing techniques and deep learning techniques, and wherein the 3D avatar of the second user type is generated in the automatic manner in an online mode and in real-time.

23. The method as claimed in claim 18, wherein the captured one or more body images comprises straight pose image, a side pose image and a face image of the second user type, and wherein the straight pose image comprises a front pose image and a back pose image of the second user type and the side pose image comprises a right side pose image and a left side pose image of the second user type.

24. The method as claimed in claim 18, wherein the generation of the 3D avatar of a second user type in the automatic manner comprises the steps of:
carrying out a segmentation operation to obtain the segmented output image by parallelly implementing the deep learning techniques on the second input type for computing body measurements of the second user type, wherein the segmentation operation partitions the image into multiple segments for determining objects in the image and locating boundaries, and wherein the segmentation operation comprises:
determining a densepose image in the form of a first mask image, wherein the densepose image is used to detect and identify the entire human body in the second input type;
processing a frontal pose image by using the deep learning techniques for placing markers around the body image associated with the second input type for determining the body region, wherein a Zhang-Suen thinning algorithm is used for placing markers around the body image associated with the second input type;
computing a classifier image as a second mask image using the determined body region by apply the deep learning techniques;
computing an external body contour image of the second user type by processing a segmented output image;
extracting the one or more key points on the computed external body contour image, wherein the key points are extracted using at least one or more logic elements;
correlating the body images associated with the second input type using the second user type's height for accurately determining the body measurements of the second user type; and
carrying out an approximation operation on the determined body measurements for approximately computing the body measurements of the second user type;
transmitting the determined body measurements of the second user type to a celery node unit along with a face image of the second user type, in the form of a second request, for generating a full body avatar of the second user type in a 3D format, the second request is transmitted asynchronously to the celery node unit; and
triggering an API for intimating the second user type on the generation of the full body avatar in 3D format by sending at least a notification on the interactive web application or an SMS and an email along with a link of the full body avatar of the second user type.

25. The method as claimed in claim 24, wherein a capsule neural network (CapsNet) is implemented for carrying out the segmentation operation and computing the body measurements of the second user type, and wherein the CapsNet architecture comprises two convolutional layers (Conv1 and Conv2) and one fully connected layer.

26. The method as claimed in claim 25, wherein the implementation of the CapsNet for carrying out the segmentation operation and computation of the body measurements of the second user type comprises the steps of:
inputting, to the CapsNet, an image of a dimension '512×512' (height (H) and width (W)) providing the determined body portion of the second user type;
passing the image to the Conv1 layer of the CapsNet, wherein the Conv1 is of a dimension '512×512×1× 128', and wherein the Conv1 layer has 128, 9×9 convolution kernels with a stride of 1 and comprises a Rectified Linear Unit (ReLU) activation;
passing the output of the Conv1 layer as an input to the Conv2, wherein the Conv2 layer is of a dimension '512×512×1×128', and wherein the Conv2 layer has 128, 9×9 convolution kernels with the stride of 1 and comprises the ReLU activation;
selecting by the Conv1 layer and Conv2 layer, a pixel size of the body image and running a window of a pre-determined size through the body image associated with the second input type, starting from left side and going to the right side of the image, pixel by pixel, which converts pixel intensities to the activities of local feature detectors, wherein running of window segments the body image into multiple small images, which are combined together for determining an output image;
providing the output image from the Conv2 layer as an input to a primary capsule layer of a dimension '512× 512×32×8';
providing an output from the primary capsule layer as an input to a segmentation capsule (SegCaps) layer, wherein the Segcaps layer is of a dimension '512×512× 1×16';
processing by the SegCaps layer, the received input and providing an output to a reconstruction convolution layer having a dimension of '512×512×128' for generating the second mask image; and
processing further by the SegCaps layer, the received input image for computing length of one or more vectors associated with the received input image for providing a segmented output image having a dimension of '512×512' for determining body measurements of the second user type, and wherein a CapsNet loss function ($l_k$), associated with a Capsule k, is computed.

27. The method as claimed in claim 24, wherein processing of the second request by the celery node unit comprises the steps of:
selecting a pre-stored base model from one or more pre-stored base models which is a nearest neighbor of a measurement in a 90 degrees dimension space, wherein the base model is representative of a human body 3D model with pre-defined measurements;
applying at least a shrinking operation or an elongation operation on each measurement of the base model in accordance with the received body measurements of the second user type, wherein the celery node unit selects the closest base human body 3D model such that the shrinking or elongation of measurements is not visible in the rendered full body 3D avatar of the second user type;

using a ball tree data structure for efficiently computing the nearest neighbor in the 90 degrees dimension space for selecting the base model, wherein the ball tree structure provides determining the nearest human base model among the several base models based on determining the base models in the tree that are closest to a given base model by a distance metric, and wherein a Mahalanobis distance technique, as the distance metric, is implemented by the celery node unit for selecting the nearest base model from several base models;

generating the full body avatar of the second user type in the 3D format using at least a node 1, a node 2 or a node 3 based on the selected base model; and transmitting the generated full body avatar of the second user type in the 3D format to an avatar generation unit, and wherein the avatar generation unit is configured to transmit the generated full body avatar of the second user type to the database using the 3D object management API for storage and future retrieval.

28. A computer program product comprising a non-transitory computer-readable medium having computer program code stored thereon, the computer-readable program code comprising instructions that, when executed by a processor, causes the processor to:

receive inputs from a first user type, via a first input unit, for generating one or more garment types in a graphical format, wherein the inputs for generating the one or more garment types comprises a fully stitched garment image, a 2D flat image of the garment or a 3D sketch image of the garment;

generate a 3D avatar of a second user type by capturing a first input type and a second input type respectively received via a second input unit, wherein the first input type comprises measurements of body specifications of the second user type and the second input type comprises body images of the second user type captured from different angles via a camera present on the second input unit in a 2D format and received based on employing a body measurement Application Programming Interface (API), wherein the 3D avatar of the second user type is generated by parallelly implementing a combination of deep learning techniques including Convolutional Neural Network (CNN) technique, a Graph Neural Network technique and a Capsule Neural Network technique on the second input type, selecting the technique that provides a high accuracy for computing one or more body measurements of the second user type to obtain a segmented output image, implement a combination of classification techniques on the segmented output image including Bayesian, k-Nearest Neighbors (k-NN), Support Vector Machine (SVM), decision trees, adaptive boosting, random forest, Multilayer Perceptron (MLP) and expectation-maximization classifier, selecting the classification technique that provides a high accuracy in computation of body contours of the second user type for computing an external body contour image of the second user type, and extracting one or more key points from the computed external body contour image of the second user type, and wherein the Graph Neural Network technique is implemented to process the extracted one or more key points for determining the body measurements of the second user type; and render the generated garment types on the generated 3D avatar of the second user type for carrying out a virtual try-on operation.

* * * * *